US008780988B2

(12) United States Patent
Pan et al.

(10) Patent No.: US 8,780,988 B2
(45) Date of Patent: Jul. 15, 2014

(54) HIERARCHICAL VIDEO ANALYSIS-BASED REAL-TIME PERCEPTUAL VIDEO CODING

(75) Inventors: Feng Pan, Richmond Hill (CA); Lewis Leung, Markham (CA)

(73) Assignee: VIXS Systems, Inc., Toronto, Ontario (CA)

( * ) Notice: Subject to any disclaimer, the term of this patent is extended or adjusted under 35 U.S.C. 154(b) by 1604 days.

(21) Appl. No.: 12/039,391

(22) Filed: Feb. 28, 2008

(65) Prior Publication Data

US 2009/0219986 A1     Sep. 3, 2009

(51) Int. Cl.
*H04N 7/12*     (2006.01)

(52) U.S. Cl.
USPC ................ 375/240.16; 375/240.27; 382/235

(58) Field of Classification Search
USPC ............. 375/240.1, 240.16, 240.27; 382/232, 382/235
See application file for complete search history.

(56) References Cited

U.S. PATENT DOCUMENTS

| | | | | |
|---|---|---|---|---|
| 5,708,732 | A * | 1/1998 | Merhav et al. | 382/232 |
| 6,188,728 | B1 * | 2/2001 | Hurst | 375/240.16 |
| 6,654,025 | B1 * | 11/2003 | Kaczowka | 345/592 |
| 6,816,611 | B1 * | 11/2004 | Hagiwara et al. | 382/165 |
| 6,970,579 | B1 * | 11/2005 | Thornton | 382/115 |
| 7,224,731 | B2 * | 5/2007 | Mehrotra | 375/240.16 |
| 7,302,103 | B2 * | 11/2007 | Keeney et al. | 382/239 |
| 7,315,631 | B1 * | 1/2008 | Corcoran et al. | 382/118 |
| 7,546,023 | B2 * | 6/2009 | Hamada | 386/252 |
| 7,627,180 | B2 * | 12/2009 | Tabuchi et al. | 382/232 |
| 7,728,900 | B2 * | 6/2010 | Fukushima et al. | 348/311 |
| 8,019,175 | B2 * | 9/2011 | Lee et al. | 382/282 |
| 8,179,961 | B2 * | 5/2012 | Chen et al. | 375/240.01 |
| 8,184,153 | B2 * | 5/2012 | Kang et al. | 348/135 |
| 8,565,301 | B2 * | 10/2013 | Tian et al. | 375/240.05 |
| 8,655,030 | B2 * | 2/2014 | Li et al. | 382/118 |
| 2004/0240562 | A1 * | 12/2004 | Bargeron et al. | 375/240.29 |
| 2007/0140569 | A1 * | 6/2007 | Tabuchi et al. | 382/232 |
| 2009/0323803 | A1 * | 12/2009 | Gomila et al. | 375/240.02 |

OTHER PUBLICATIONS

Wu, D., et al, "Fast Intermode Decision in H.264/AVC Video Coding", IEEE Transactions on Circuits and Systems for Video Technology, vol. 15, No. 6, Jul. 2005, 6 Pages.
Sun, Y., et al, "Perceptually Adaptive Rate-Distortion Optimization for Variable Block Size Motion Alignment in 3D Wavelet Coding", Dept. of Electrical & Computer Engineering, Nat. Univ. of Singapore; 2005 IEEE, 4 pages.
Li, Z.G., et al, "A Unified Architecture for Real-Time Video-Coding Systems", IEEE Transactions on Circuits and Systems for Video Technology, vol. 13, No. 6, Jun. 2003, 16 Pages.

* cited by examiner

*Primary Examiner* — Brian O'Connor
(74) *Attorney, Agent, or Firm* — Garlick & Markison; Bruce E. Stuckman

(57) ABSTRACT

A system for encoding a video stream into a processed video signal that includes at least one image. The system includes a downscaling module, a partitioning module, a rate control module, and an encoder section. The downscaling module receives the video stream and produces a downscaled video stream. A partitioning module, including a region detection module, receives the downscaled video stream and detects a pattern of interest in the at least one image. The partitioning module is operable to partition the at least one image based on the detected pattern of interest. The rate control module that receives an output from the partitioning module and produces an encoder control signal dependent on the output from the partitioning module. The encoder section, coupled to the rate control module, receives the video stream and generates the processed video signal.

22 Claims, 8 Drawing Sheets video distribution system 100 video storage system 118 video processing device 130

HIERARCHICAL VIDEO ANALYSIS-BASED REAL-TIME PERCEPTUAL VIDEO CODING

TECHNICAL FIELD

The present invention relates to encoding used in devices such as video encoders/decoders.

DESCRIPTION OF RELATED ART

Video encoding has become an important issue for modern video processing devices. Robust encoding algorithms allow video signals to be transmitted with reduced bandwidth and stored in less memory. The fidelity of these encoding methods, however, face the scrutiny of users that are becoming accustomed to higher resolution and better picture quality. Standards specifications have been promulgated for many encoding methods including the H.264 standards specification, which is also referred to as the MPEG-4, part 10, or Advanced Video Coding ("AVC") standards specifications.

Further limitations and disadvantages of conventional and traditional approaches will become apparent to one of ordinary skill in the art through comparison of such systems with the present invention.

DETAILED DESCRIPTION OF THE DRAWINGS

Figure 1:
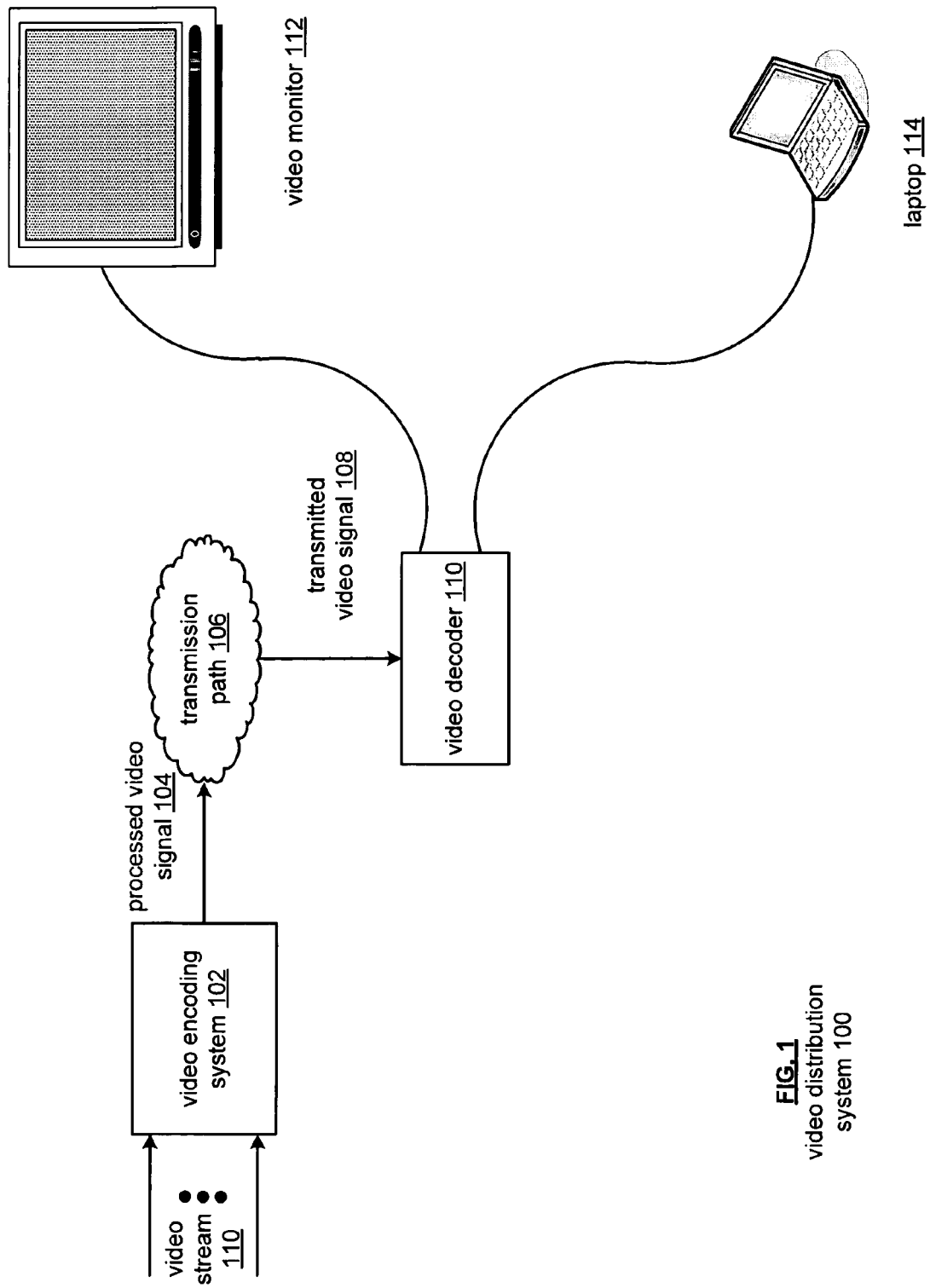
FIG. 1 presents a block diagram representation of a video distribution system 100 in accordance with an embodiment of the invention.

FIG. 1 presents a block diagram representation of a video distribution system 100 in accordance with an embodiment of the invention. In particular, processed video signal 104 is transmitted via transmission path 106 to a video decoder 110. The video decoder 110, in turn, can operate to decode the processed video signal 104 for display on a display device such as a video monitor 112, a laptop computer 114, or other display device.

The transmission path 106 can include a wireless path that operates in accordance with a wireless local area network protocol such as an IEEE 802.11 protocol (such as 802.11a, 802.11b, 802.11g, 802.11n, et cetera), a WiMAX protocol, a Bluetooth protocol, Fly Wire, et cetera. Further, the transmission path can include a wired path that operates in accordance with a wired protocol such a Universal Serial Bus ("USB") protocol, an Ethernet protocol (such as IEEE 802.3), Firewire protocol (IEEE 1439), or other high-speed protocol.

The transmission path 106, whether wired, wireless, or a combination thereof, has a transmission or bandwidth limit, which may be due to several factors. For example, the bandwidth of the transmission path 106 may be due to other components having low bandwidth capacity, transmissions may be hampered by excessive noise or environmental factors, et cetera.

Due to limitations in bandwidth, storage, and/or delay, the video encoding system 102 serves to realize increased bit savings while efficiently transporting media content through the processed video signal 104 over the transmission path 106. The increased bit savings are possible through intelligent image and video analysis techniques that customize the nature of the video under coding to produce the processed video signal 104, as is discussed in detail with reference to FIGS. 2 through 9.

Figure 2:
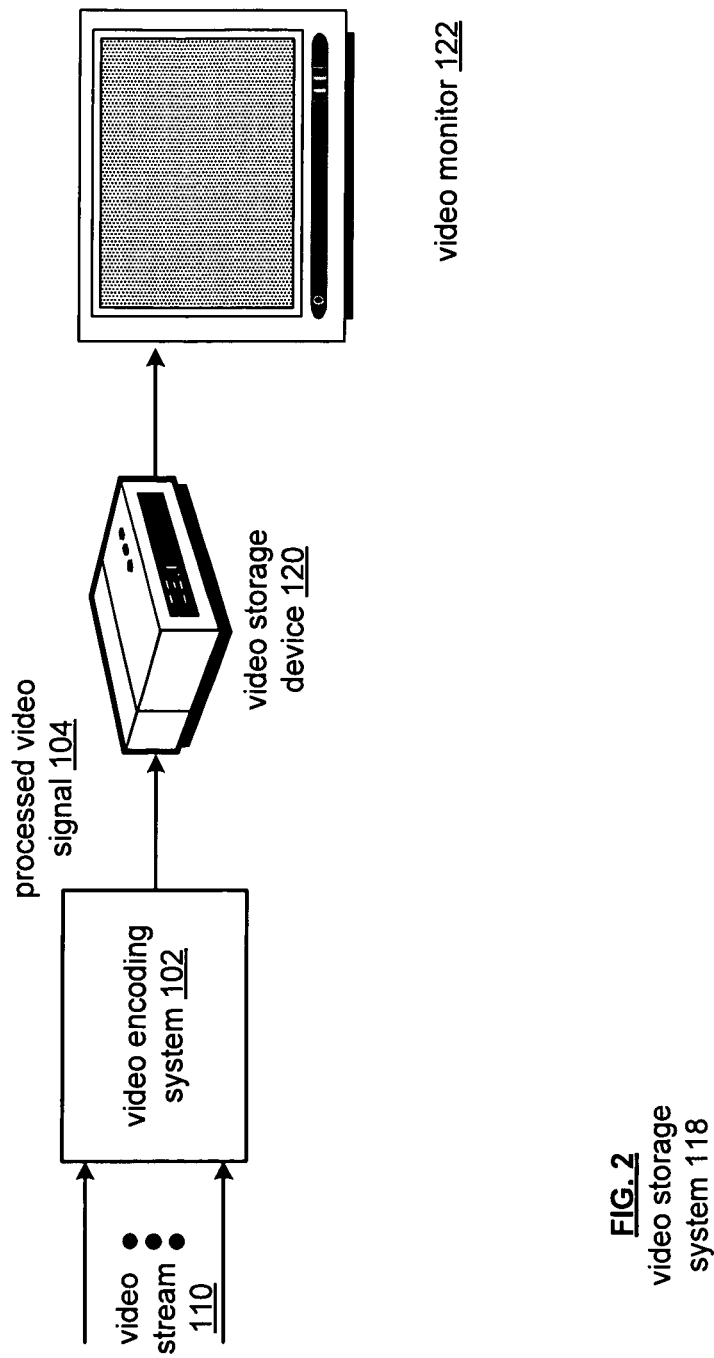
FIG. 2 presents a block diagram representation of a video storage system 118 in accordance with an embodiment of the invention.

FIG. 2 presents a block diagram representation of a video storage system 118 in accordance with an embodiment of the invention. In particular, device 120 is a set top box with built-in digital video recorder functionality, stand alone digital video recorder functionality, DVD recorder/player functionality, or other device functionality that stores the processed video signal 104 for display on video display device such as television 122. While video encoder 102 is shown as a separate device, it can further be incorporated into video storage device 120.

The video storage system 118 can include a hard drive, flash memory device, computer, DVD burner, or any other device that is capable of generating, storing, decoding, and/or displaying the processed video signal 104 in accordance with the methods and systems described in conjunction with the features and functions of the present invention as described here.

These devices have data storage and transport limitations that can be improved by increasing the coding efficiency of the processed video signal 104. That is, the smaller or compact the data files are for multimedia content, the more efficiently the data storage devices may store the information. Further, high bandwidth data streams, such as high-definition video streams, are more readily transported over available transmission paths that may otherwise experience noticeable transmission delays and/or interruption.

The video encoding system 102 provides increased bit savings, and efficient pre-encoder processes to reduce the associated processor and storage resources, as well as providing a processed video signal 104 with multimedia content that is more readily stored, distributed, and disseminated in the video storage system 118, which is discussed in detail with reference to FIGS. 3 through 9.

Figure 3:
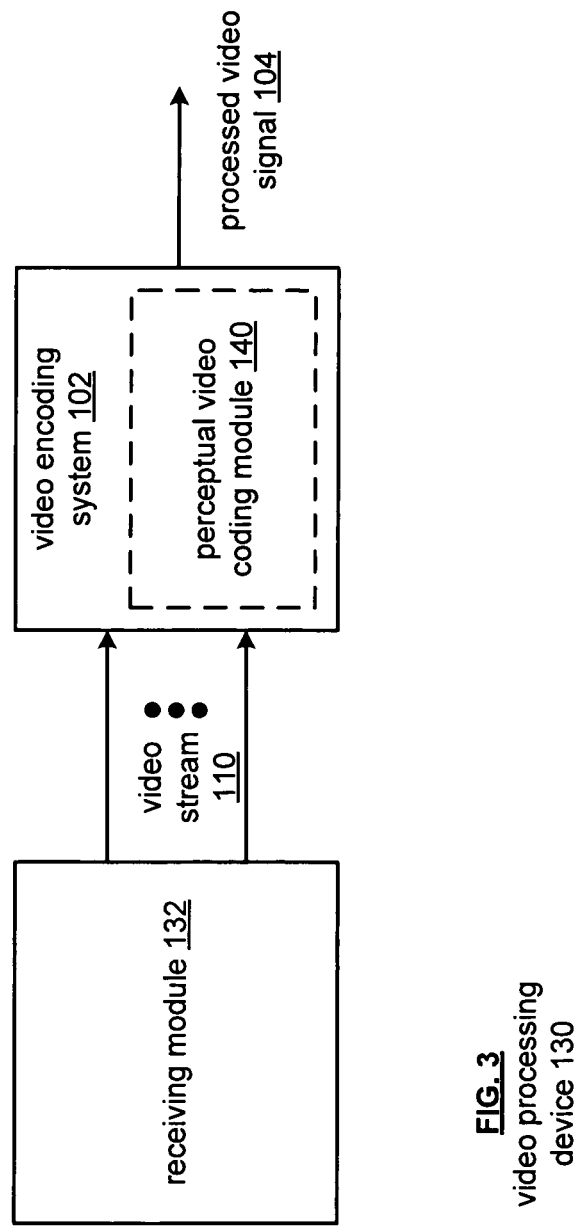
FIG. 3 presents a block diagram representation of a video processing device 130 in accordance with an embodiment of the invention.

FIG. 3 presents a block diagram representation of a video processing device 130 in accordance with an embodiment of the invention. In particular, video processing device 130 includes a receiving module 132, such as a set-top box, television receiver, personal computer, cable television receiver, satellite broadcast receiver, broadband modem, 3G transceiver, or other information receiver or transceiver that is capable of producing video stream 110 from one or more sources such as a broadcast cable system, a broadcast satellite system, the Internet, a digital video disc player, a digital video recorder, or other video source. Video encoding system 102 is coupled to the receiving module 132 to encode, transrate, and/or transcode one or more of the video streams 110 to form processed video signal 104.

In an embodiment of the present invention, the video stream 110 can include a broadcast video signal, such as a television signal, high definition television signal, enhanced high definition television signal, or other broadcast video signal that has been transmitted over a wireless medium, either directly or though one or more satellites or other relay stations, or through a cable network, optical network or other transmission network. In addition, the video stream 110 can be generated from a stored video file, played back from a recording medium such as a magnetic tape, magnetic or optical disc, and can include a streaming video signal that is transmitted over a public or private network such as a local area network, wide area network, metropolitan area network, mesh networks, and/or the Internet.

Video stream 110 can also include an analog video signal that is formatted in any of a number of video formats including, for example, National Television Systems Committee (NTSC), Phase Alternating Line (PAL), or Sequentiel Couleur Avec Memoire (SECAM). Processed video signal 104 includes conforms to a digital video coding standard specification such as H.264, MPEG-4 Part 10 Advanced Video Coding (AVC) or other such digital format including Moving Picture Experts Group (MPEG) format (for example, MPEG-1, MPEG-2, MPEG-4, et cetera), QuickTime format, Real Media format, Windows Media Video (WMV) or Audio Video Interleave (AVI), or another digital video format, whether standardized or proprietary in nature. Further, the video stream 110 can include interlaced and/or progressive high-definition digital formats, such as 480p, 720p, 1080i, 1080p, et cetera.

The video encoding system 102 includes a perceptual video coding module 140 that will be described in greater detail in regards to many optional functions and features of FIGS. 3 through 9.

Figure 4:
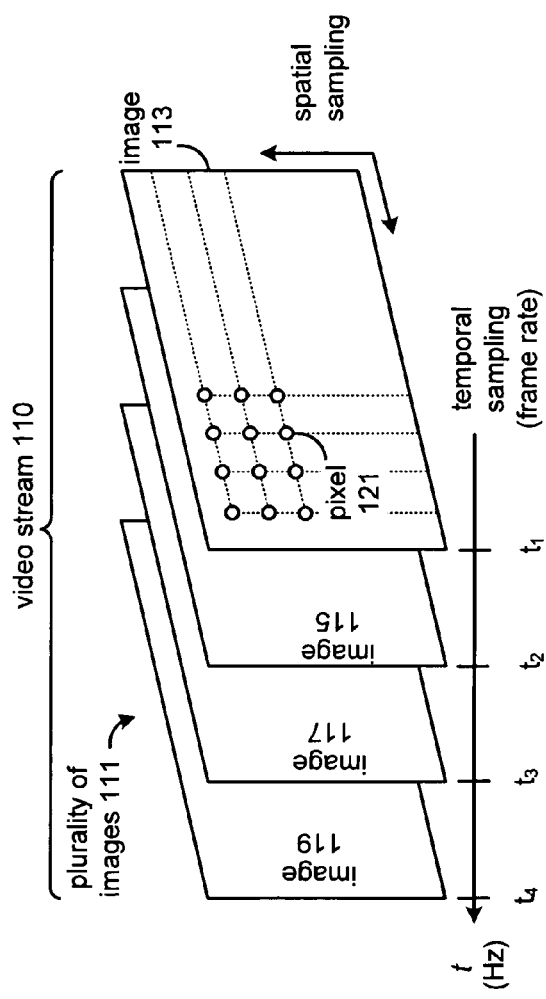
FIG. 4 presents a video stream that includes at least one image.

FIG. 4 presents a video stream 110 that includes at least one image. The video stream 110, by way of example, includes sequential video images 113 through 119, which represent a natural visual scene that is spatially and temporally continuous. Producing a natural visual scene in digital form involves spatially sampling the natural scene (such as on a rectangular grid in the video image plane) and temporally sampling the natural scene (such as in a series of still images or components of images sampled at regular intervals in time). Each spatiotemporal sample (such as pixel 121) is represented as a number or set of numbers or macroblocks that describe the brightness (luminance) and color of the sample. A macro block is a basic unit for motion-compensated prediction in several visual coding standards specifications Temporal sampling captures a moving video image by taking a "snapshot" of the signal at a periodic time intervals, such as time intervals $t_1$, $t_2$, $t_3$, $t_4$, et cetera. Playing back the series of images produces the appearance of motion. A higher temporal sampling rate provides smoother motion in the video scene, but also requires more samples to be captured and stored. For example, sampling at 25 or 30 complete images or frames per second is considered a common rate for televised pictures. As a further example, sampling at 50 or 60 frames per second produces smooth apparent motion, though at the expense of a very high data rate.

The images 113-119 may be sampled as a series of complete frames for progressive sampling, or as a sequence of interlaced fields for interlaced sampling. As one of ordinary skill in the art may appreciate, an interlaced video sequence has half of the data in a frame (that is, one "field") sampled at each temporal sampling interval, in which the field consists of either the odd-numbered or even-numbered lines within a complete video frame and an interlaced video sequence contains a series of fields, each representing half of the information in a complete video frame.

Interlaced sampling is considered to have the advantage of transmitting twice as many fields per second as the number of frames in an equivalent progressive sequence with the same data rate. However, to accommodate the greater number of fields and pixel densities in either format, the additional storage, buffering, and processing overhead requirements must be taken into consideration. Further, the processing of such a large magnitude of data imposes transmission and processing delays that interrupt or delay real-time playback of images within the video stream 110. To facilitate real-time processing of the video stream 110, the video stream 110 is provided to the perceptual video coding module 140, which operates to downscale, segment, and provide bit allocation to patterns of interest within the video images.

Figure 5:
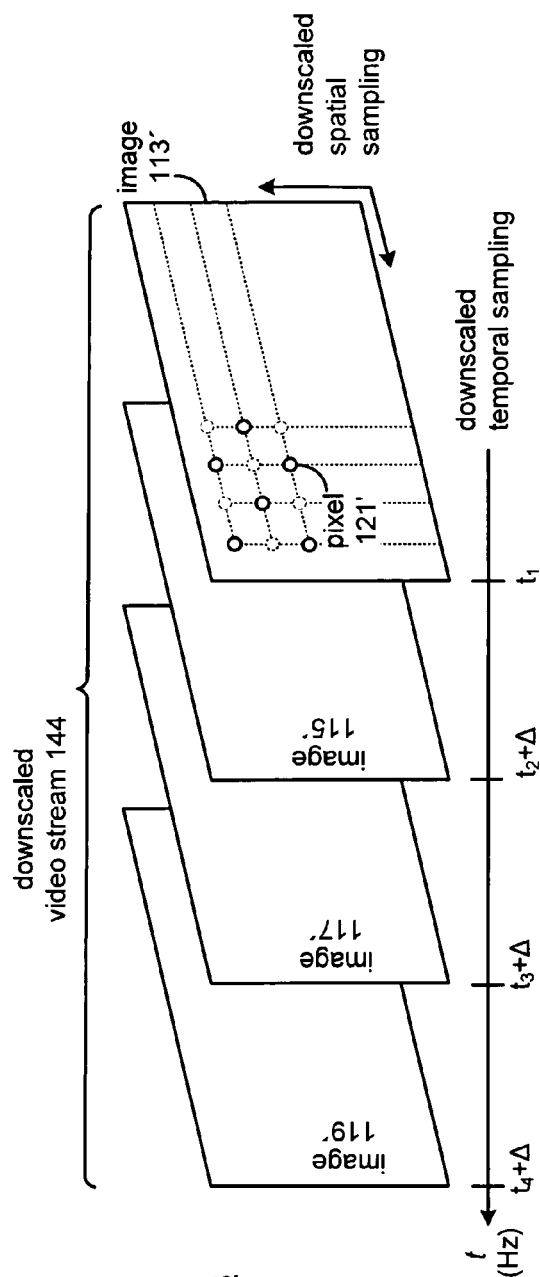
FIG. 5 presents a downscaled video stream that includes the at least one image of the video stream of FIG. 4.

FIG. 5 presents a downscaled video stream 144 that includes the at least one image of the video stream 110. The downscaled video stream 144 is spatially downscaled to produce a spatial sampling having less pixel density, and is temporally downscaled to reduce the rate of the video stream. By way of example, the downscaled video stream 144 includes downscaled images 113' through 119', which are temporally downscaled by a delay $\Delta$ for a temporal spacing of $t_1+\Delta$, $t_2+\Delta$, $t_3+\Delta$, $t_4+\Delta$, et cetera. The video stream 110 may also be temporally downscaled by "decimating" or removing images within a sequence. Consideration must be taken however, to the overall effect of this decimation on the capability to reliably encode and decode such a temporally-decimated video stream.

The downscaled temporal sampling provides for faster and more expedient content analysis within the perceptual video coding module 140 for "redundancy" analysis between sequential images. That is, the video encoding system 102 produces a residual image—a frame that indicates the differences between the images.

The downscaled spatial sampling provides lower pixel resolution including pixels 121', with those pixels removed/downscaled are indicated by hashed lines. The downscaled spatial sampling, with lower resolution, permits faster and more expedient content analysis of the images via the perceptual video coding module 140.

Figure 6:
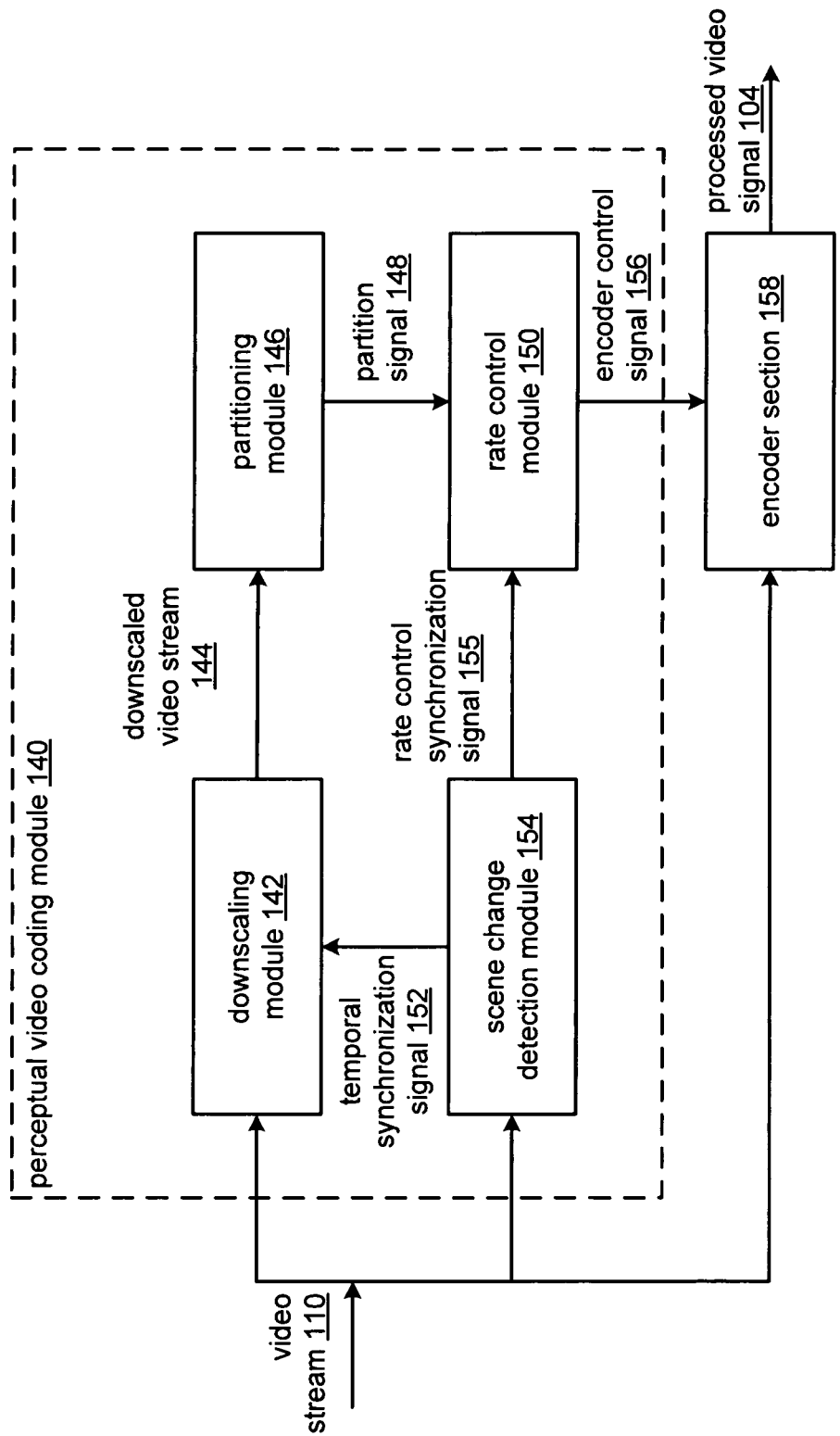
FIG. 6 presents a perceptual video coding module in accordance with an embodiment of the present invention.

FIG. 6 presents a perceptual video coding module 140 in accordance with an embodiment of the present invention. The perceptual video coding module 140 includes a downscaling module 142, a partitioning module 146, a rate control module 150, and a scene change detection module 154.

To achieve real-time video segmentation, the video stream 110 is downsized by the downscaling module 142 to produce a downscaled video stream 144. The reduced pixel resolution and lower frame rate is at a level sufficient to retain scene information and to optimize the partitioning of the images in a real time manner. An example of such downscaling includes the downscaling from a 1920 vertical pixel by 1080 horizontal pixel resolution at 30 Hz format to a downscaled video stream having a 176 vertical pixel by 128 horizontal pixel resolution at 3 Hz format.

The partitioning module 146 receives the downscaled video stream 144, which performs image segmentation on the much smaller spatial resolution and lower frame rate of the downscaled video stream 144. In operation, the downscaled video stream reduces the processing time and the power consumption otherwise required to process the images of the perceptual video coding module 140 generally.

The partitioning module 146 partitions the downscaled video stream to produce different regions in an image. The use of the downscaled video stream 144 increases the processing effectiveness of the partitioning module 146.

Based upon the perceptual importance of the image contents, the partitioning module 146 partitions the downscaled video stream 144 into different regions, each region having identified patterns of interest, to produce a partition signal 148. The different regions can include such items as human features (e.g., faces, hair, et cetera), structure features (e.g., buildings, architecture, et cetera), turf features (e.g., grass, trees, et cetera), a sky features (e.g., clouds, colors, hues, et cetera), and the like.

Homogenous regions exists within natural video sequences, and many of these may be stationary regions. Macroblocks representing these regions may be encoded using larger block sizes, edge information to represent the extent of homogeneity of the macroblocks, and temporal information to represent the stationary characteristics of the macroblocks. The partitioning module 146 is described in detail with reference to FIG. 7.

The rate control module 150 receives the partitioning signal 148, and produces an encoder control signal 156. The rate control module 150 maps the resulting region partitions to the original video resolution and frame rate, and is used to encode the original video resolution and frame rate of the video stream 110. The rate control module 150 operates to control the bit budget distribution during the coding process by the encoder section 158 and is discussed in detail with reference to FIG. 8.

The scene change detection module 154 refreshes the content analysis and segmentation at a scene boundary via the temporal synchronization signal 152 to the downscaling module 142, and via the rate control synchronization signal 155 to the rate control module 150.

The temporal synchronization signal 152 operates to indicate to the downscaling module 142 to downscale the corresponding image, upon a scene change within the video stream 110. The downscaled image is then provided to the partitioning module 146 for capture of the new image information within the scene. For example, the video stream is temporally downscaled (such as from a rate of 30 Hz to 3 Hz) to reduce computational complexity in segmentation of the video stream. Upon an indication of a scene change by the temporal synchronization signal 152, the downscaling module 142 operates to downscale the corresponding image of the video stream 110 for the partitioning module 146 to generate "new" segmentation information of the changed scene.

The rate control synchronization signal 156, generated by scene change detection module 154, indicates to the rate control module 150 that the image is to be coded as an "intra frame" because the previous image is not capable of providing a reference or basis for the "new scene" image. That is, the "new scene" image is not relative to any previous image in the video sequence.

The scene change detection may be based upon the temporal difference between consecutive frames, for example the temporal difference between image 113 and image 115 of video stream 110. In general, changes between video frames may be caused by object motion (e.g., a moving car, moving arm), camera motion (e.g., panning, tilt, zoom, rotation), uncovered regions (e.g., a portion of a scene uncovered by a moving object), lighting changes, et cetera.

Figure 7:
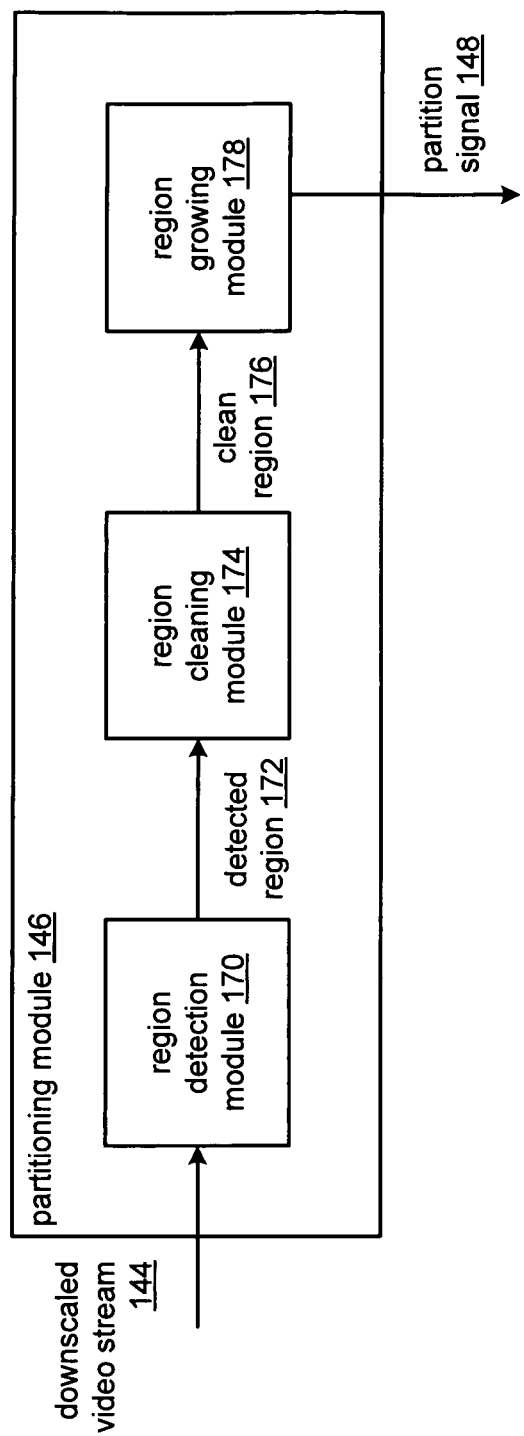
FIG. 7 presents a block diagram representation of a partitioning module in accordance with an embodiment of the present invention.

FIG. 7 presents a block diagram representation of a partitioning module 146 in accordance with an embodiment of the present invention. The partitioning module 146 includes a region detection module 170, a region cleaning module 174, and a region growing module 178.

The region detection module 170 detects a detected region 172 in the image and wherein the region is based on the detected region. In operation, the region detection module 170 detects the presence of a particular pattern or other region of interest that may require greater image quality. An example of such a pattern is a human or other face; however, other patterns including symbols, text, important images and as well as application specific patterns and other patterns can likewise be implemented.

The partitioning module 146 may also include the region cleaning module 174 that generates a clean region 176 based on the detected region 172, such as via a morphological operation.

The partitioning module 146 can further include a region growing module that expands the clean region 176 to generate a partition signal 148 that identifies the region containing the pattern of interest.

Considering, for example, the case where one of images of the downscaled video stream 144 includes a human face and the partitioning module 146 generates a region corresponding to the human face, the region detection module 170 can generate a detected region 172 based on the detection of pixel color values corresponding to facial features such as skin tones. Region cleaning module 174 can generate a more contiguous region, such as clean region 176, that contains these facial features, and the region growing module 178 can grow this region to include the surrounding hair and other image portions to ensure that the entire face is included in the region identified by the perceptual queue signal 148.

Figure 8:
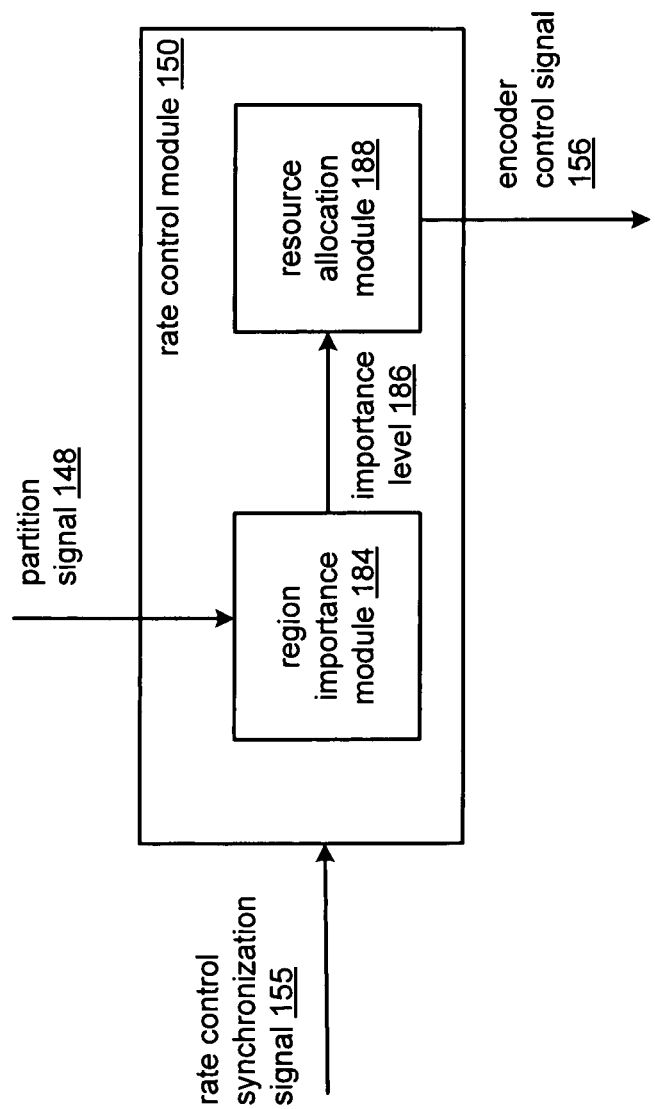
FIG. 8 presents a block diagram representation of a rate control module in accordance with an embodiment of the present invention.

FIG. 8 presents a block diagram representation of a rate control module 150 in accordance with an embodiment of the present invention. The rate control module 150 includes a region importance module 184 and a resource allocation module 188.

The region importance module 184 designates the importance level of regions within an image. The resource allocation module 188 allocates bits to different regions and/or macroblocks within the frames based on the amount of available bits, the scene complexity, and the output buffer capacity of the encoder section (that is, such that the buffer does not overflow, causing a loss of image data).

The resource allocation module 188 carries out the budgeting of the bits to the patterns of interest based upon the importance level 186, and provides an encoder control signal 156. For example, in variable block-size motion compensation (VBSMC) techniques, such as that in the H.264 video coding specification, different block modes are contemplated for providing segmentation of moving regions among images. The H.264 specification provides seven macroblock coding modes including sizes of 16-by-16, 16-by-8, 8-by-16, 8-by-8, 8-by-4, 4-by-8, and 4-by-4, which can be used together in a single macroblock that is a 16×16 pixel region of an image.

For a given region of importance, the resource allocation module 188 implements a rate distortion optimization (RDO) for selecting the best macroblock mode for the region, each macroblock mode is tried, and the one leading to the least-rate distortion cost is the mode used. The least-rate distortion cost seeks to achieve the most appropriate trade-off of the bit rate and the distortion performance. The resource allocation module 188 may analyze the RDO using a LaGrange multiplier method, which is based on converting a constraint optimization problem to one that is unconstrained.

Further, the resource allocation module 188 may use a target bit estimation, which includes the total number of bits for a group of images, the remaining bits of a group of images, and the target bits of the current image, assessed against the size of the buffer for the encoder section 158.

The encoder section 158 can operate using the encoder control signal 156 to emphasize the patterns of interest within an image while de-emphasizing other patterns outside the pattern or a given region that contains the pattern of interest. It should be noted that the overall image may be of higher quality to a viewer given the greater sensitivity and discernment of regions of importance within an image.

Figure 9:
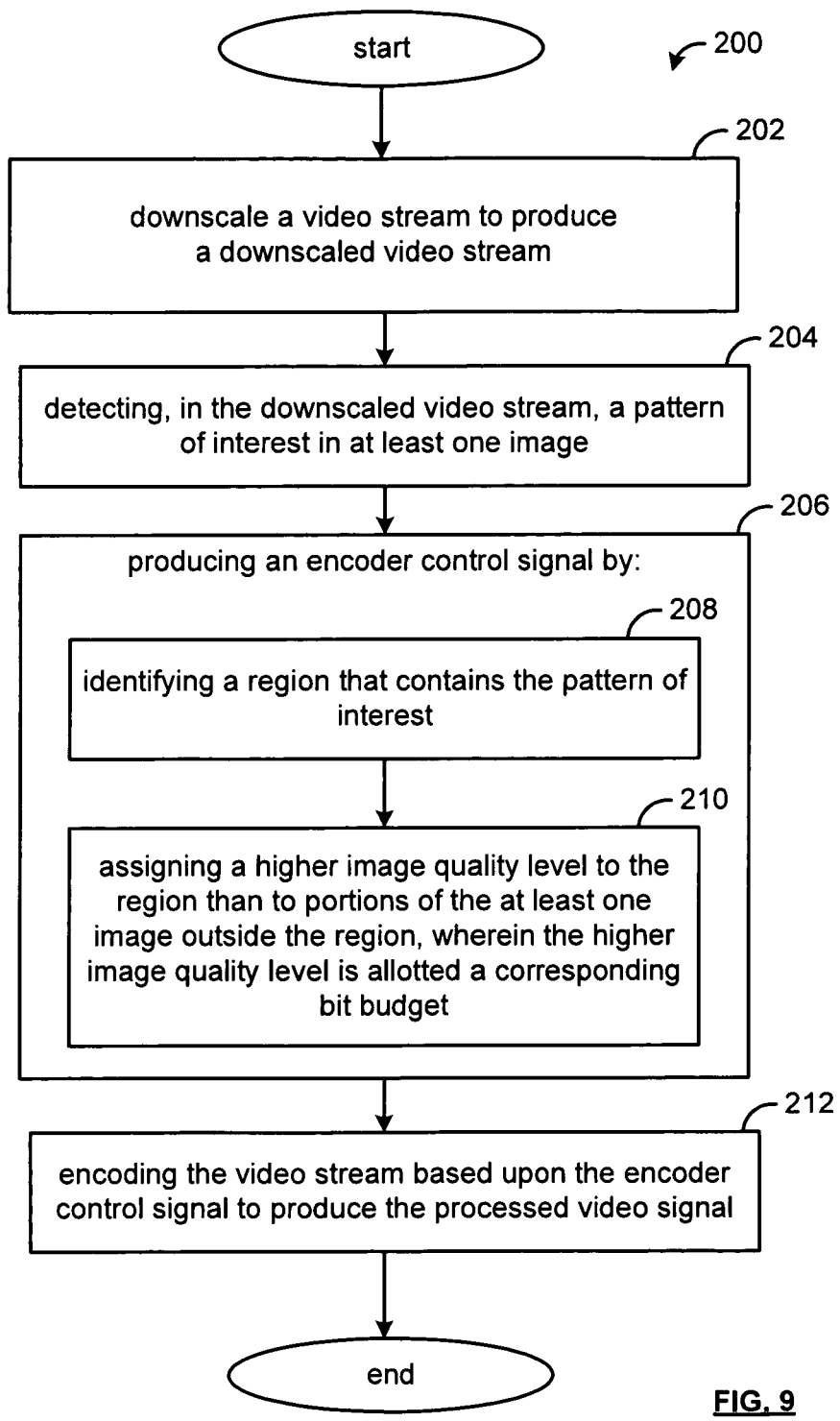
FIG. 9 presents a flowchart representation of a method in accordance with an embodiment of the present invention.

FIG. 9 presents a flowchart representation of a method 200 in accordance with an embodiment of the present invention. In particular, a method is presented for use in conjunction with one or more functions and features described with reference to FIGS. 1 through 8.

In step 202, a perceptual video coding module downscales a video stream to produce a downscaled video stream. A pattern of interest, in at least one image, is then detected in the downscaled video stream at step 204. The video stream may be downscaled temporally and/or spatially. By downscaling the video stream, subsequent image/media processing is capable of providing coding that is customized to the nature of the video undergoing the encoding process. Further, subsequent processing is capable of processing images, regions and/or objects on a real-time basis, and is capable of further realizing increased bit-allocation efficiency based upon the reduced resolution of the images within the video stream. Furthermore, the video stream downscaling may be further refined by providing a temporal synchronization signal based upon scene changes within a video stream.

The perceptual video coding module produces an encoder control signal, at step 206, by identifying a region that contains the pattern of interest at step 208, and assigning a different image quality level to the region than to a portion of one or more images adjacent the region, wherein the different image quality level is allotted a corresponding bit budget at step 210.

The bit budget may be based upon a rate distortion optimization (RDO) techniques for selecting the best macro block mode for the regions, each macro block mode is analyzed, and the one leading to the least-rate distortion cost is the selected mode. The least-rate distortion cost seeks to achieve the most appropriate trade-off of the bit rate and the distortion performance. As one of ordinary skill in the art may appreciate, the RDO analysis may use a LaGrangian multiplier technique, which is based on converting a constraint optimization problem to one that is "unconstrained."

At step 212, the video stream is encoded based upon the encoder control signal to produce a processed video signal. The resulting processed video signal realizes a further level of bit savings and processing resource management efficiency in the resulting processed video signal as compared to processing the content of a higher-resolution video stream.

While particular combinations of various functions and features of the present invention have been expressly described herein, other combinations of these features and functions are possible that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" is used in the description of the drawings, a module includes a functional block that is implemented in hardware, software, and/or firmware that performs one or more functions such as the processing of an input signal to produce an output signal. As used herein, a module may contain sub modules that themselves are modules.

Thus, there has been described herein an apparatus and method, as well as several embodiments including a preferred embodiment, for implementing a system and/or apparatus to encode a video stream into a processed video signal, in which the video stream including at least one image.

It may be apparent to those skilled in the art that the disclosed invention may be modified in numerous ways and may assume many embodiments other than the preferred forms specifically set out and described above. Accordingly, it is intended by the appended claims to cover all modifications of the invention that fall within the true spirit and scope of the invention.

What is claimed is:

1. A system for encoding a video stream into a processed video signal, the video stream including at least one image, the system comprising:
   a scene change detection module that receives the video stream, that detects a scene change to a new scene of the video stream and that produces a temporal synchronization signal in response thereto;
   a downscaling module that receives the video stream and produces a downscaled video stream by a temporal downscaling and a spatial downscaling of the video stream;
   a partitioning module including a detection module that receives the downscaled video stream and detects a pattern of interest in the at least one image based on the downscaled video stream, the partitioning module configured to partition the at least one image based on the detected pattern of interest, and to trigger repartition of the downscaled video stream when the temporal synchronization signal indicates the new scene;
   a rate control module that receives an output from the partitioning module and produces an encoder control signal dependent on the output from the partitioning module; and
   an encoder section, coupled to the rate control module that receives the video stream and generates the processed video signal.

2. The system of claim 1 wherein the video stream comprises a high-definition digital format including at least one of 480p, 720p, 1080i, and 1080p formats.

3. The system of claim 1 wherein the partitioning module comprises:
a region detection module that detects and defines a region partition in the at least one image and wherein the region partition is based on the detected region.

4. The system of claim 3 wherein the region detection module detects in the at least one image a region partition that includes at least one of a human feature, a structure feature, a turf feature, and a sky feature.

5. The system of claim 3 wherein the partitioning module further comprises:
a region cleaning module that generates a clean region based on the region partition.

6. The system of claim 5 wherein the region cleaning module includes a morphological operation to generate the clean region.

7. The system of claim 5 wherein the partitioning module further comprises:
a region growing module that expands the clean region to generate a region identification signal that identifies the expanded clean region.

8. The system of claim 1 wherein the rate control module further comprises:
a region importance module that assigns an importance level to the region partition that includes the pattern of interest; and
a resource allocation module that budgets a bit density to the region partition based upon the importance level of the region partition.

9. The system of claim 1 wherein the encoder control signal is configured to assign an encoding bit budget based upon the partitioning of the image.

10. The system of claim 1 wherein the encoder section produces the processed video signal as at least one of a transcoded signal and a transrated signal.

11. The system of claim 1 wherein the temporal synchronization signal triggers the downscaling module to produce a new downscaled image from the video stream when the temporal synchronization signal indicates the new scene.

12. The system of claim 11 wherein the scene change detection module is further coupled to the rate control module and further produces a rate control synchronization signal, and wherein the rate control module generates the encoder control signal to indicate that a frame of the video signal corresponds to the scene boundary.

13. A method for encoding a video stream into a processed video signal, the video stream including at least one image, the method comprising:
producing a downscaled video stream, based on the video stream by a temporal downscaling and a spatial downscaling of the video stream;
detecting a pattern of interest in the at least one image, based on the downscaled video stream;
partitioning the at least one image based on the detected pattern of interest;
producing an encoder control signal that is dependent on the detected pattern of interest;
generating the processed video signal, based on the encoder control signal;
detecting a scene change to a new scene of the video stream and producing a temporal synchronization signal in response thereto; and
repartitioning of the downscaled video stream when the temporal synchronization signal indicates the new scene.

14. The method of claim 13 wherein detecting the pattern of interest includes detecting and partitioning the at least one image includes defining a region partition in the at least one image and wherein the region partition is based on the detected region.

15. The method of claim 13 wherein detecting the pattern of interest includes detecting at least one of: a human feature, a structure feature, a turf feature, and a sky feature.

16. The method of claim 14 wherein partitioning the at least one image includes generating a clean region based on the region partition.

17. The method of claim 16 wherein generating the clean region includes a morphological operation to generate the clean region.

18. The method of claim 16 wherein partitioning the at least one image includes expanding the clean region and generating a region identification signal that identifies the expanded clean region.

19. The method of claim 13 wherein producing the encoder control signal includes:
assigning an importance level to the region partition that includes the pattern of interest; and
budgeting a bit density to the region partition based upon the importance level of the region partition.

20. The method of claim 13 wherein the encoder control signal is configured to assign an encoding bit budget based upon the partitioning of the image.

21. The method of claim 13 further comprising:
wherein producing the downscaled image from the video stream is performed when the temporal synchronization signal indicates the new scene.

22. The method of claim 21 further comprising:
producing a rate control synchronization signal;
wherein the encoder control signal indicates that a frame of the video signal corresponds to the scene boundary.

* * * * *